United States Patent [19]

Ulrich

[11] Patent Number: 5,590,708
[45] Date of Patent: Jan. 7, 1997

[54] HEAT EXCHANGER BLOCK

[75] Inventor: Heinz P. Ulrich, Frankfurt, Germany

[73] Assignee: Deutsche Carbone AG, Frankfurt, Germany

[21] Appl. No.: 358,813

[22] Filed: Dec. 19, 1994

[30] Foreign Application Priority Data

Dec. 17, 1993 [DE] Germany .............................. 9319430 U

[51] Int. Cl.$^6$ ...................................................... F28F 7/02
[52] U.S. Cl. .......................................... 165/165; 165/164
[58] Field of Search ...................................... 165/147, 164, 165/165, 177, 146

[56] References Cited

U.S. PATENT DOCUMENTS 1,657,704  1/1928  Wescott ..................................... 165/165
4,156,625  5/1979  Wachendorfer, Sr. .............. 165/164 X

FOREIGN PATENT DOCUMENTS 479542  2/1938  United Kingdom ................... 165/177

Primary Examiner—Leonard R. Leo
Attorney, Agent, or Firm—Spencer & Frank

[57] ABSTRACT

A heat exchanger block includes a monoblock composed of a ceramic material having two separate conduit systems for media flowing therethrough. At least one of the conduit systems includes a conduit having a cross-sectional profile of an essentially oblong slot and having a plurality of walls. Each wall has a cross-sectional profile of overlapping circular arcs.

17 Claims, 4 Drawing Sheets

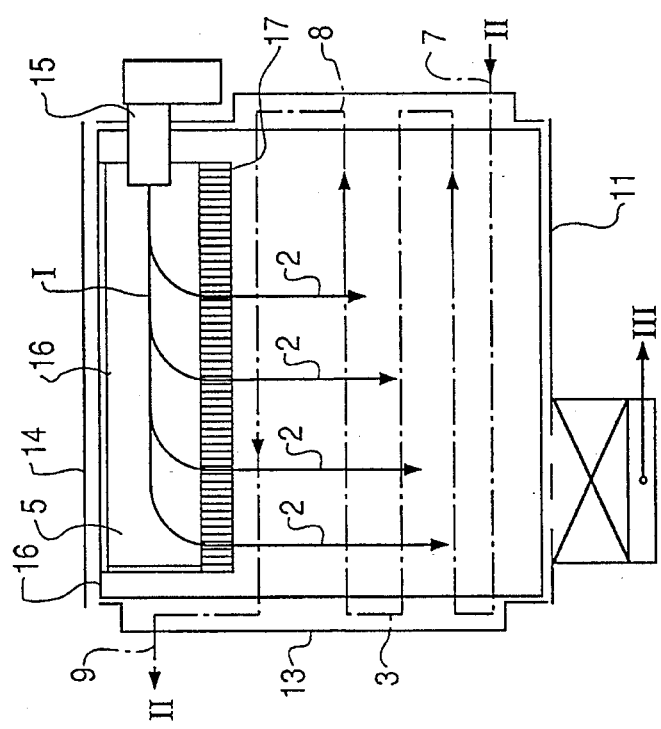
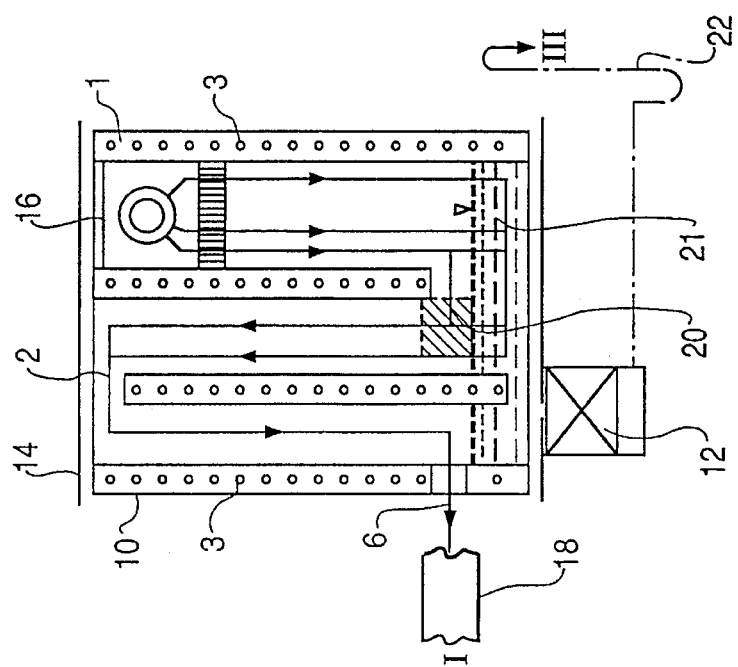

HEAT EXCHANGER BLOCK

CROSS-REFERENCE TO RELATED APPLICATIONS

This application claims the priority of application Ser. No. G 93 19 430.7 filed in Germany on Dec. 17, 1993, which is incorporated herein by reference.

BACKGROUND OF THE INVENTION

The present invention relates to a heat exchanger block manufactured from a monoblock of ceramic material and having at least two conduit systems for media flowing through the monoblock.

Heat exchangers are characterized by a defined heat exchange surface having a specific geometrical shape. Typically, they can be constructed either in the form of a bundle of pipes, or in the form of monoblocks which include corresponding bores for configuring at least two conduit systems.

In known heat exchangers of the monoblock type, all of the bores of the two conduit systems have a circular cross-section over their entire length. The bores are created during the manufacturing process by drilling the solid material of the monoblock with a suitable tool.

The disadvantage of these known monoblock heat exchangers is that, depending on the manufacturing process, a relatively small heat exchange surface is formed by the walls of the bores. A small heat exchange surface, of course, is associated with a correspondingly smaller heat transfer output.

SUMMARY OF THE INVENTION

It is an object of the present invention to provide a monoblock heat exchanger having an improved heat transfer output.

The above and other objects are accomplished according to the invention by the provision of a monoblock composed of a ceramic material and having two separate conduit systems for media flowing through the monoblock. At least one of the conduit systems includes a conduit having a cross-sectional profile of an essentially oblong slot and having a plurality of walls. Each wall of the conduit has a cross-sectional profile of overlapping circular arcs.

The manufacture of a monoblock heat exchanger according to the invention is particularly simple. The monoblock is merely drilled through with conventional drill bits, so that the bores overlap, to obtain a desired sawtooth profile having an overlapping circular arc-shaped base (hereinafter called tooth profile).

The spacing between the centers of the overlapping circular arcs is selected so that, in every case, the advantageous tooth profile shape is obtained. The further the centers of the circular arcs are spaced from one another, the higher the tooth profile becomes. In every situation, however, the circular arcs should overlap so that the necessary oblong slot is obtained.

Various conduit configurations can be obtained by combining different bore diameters, and by varying a spacing of the circular arcs from one another.

According to the invention, the conduit system with the tooth profile can be disposed either vertically or horizontally. If two such conduit systems are present, one system can be disposed vertically and the other horizontally, or both systems disposed either horizontally or vertically. Thus, both a transverse and parallel arrangement are possible.

The monoblock is preferably made of graphite, because graphite is corrosion-free and conducts heat well. Preferably, the graphite is impregnated with a suitable agent to make it gas-impermeable.

Monoblocks having the conduit system described according to the invention can be used for various materials processing, e.g., heating, cooling, condensing, or evaporation of both liquid and gaseous media.

Depending on the specific surface profile selected, in cooling and condensing of gaseous media, for example flue gases, the gaseous product is advantageously separately conveyed from the liquid condensate. Stated alternatively, while the liquid condensate drains off down the base of the profile (i.e., the root of the tooth), the non-moistened heat exchange surface (i.e., along the toothed portion of the profile) can be used to further cool the gaseous medium.

The invention will be described below in greater detail in connection with embodiments thereof that are illustrated in the drawing figures.

BRIEF DESCRIPTION OF THE DRAWINGS

FIG. 7 is a schematic view of a vertical section through the heat exchanger monoblock according to the invention, supplemented with a burner.

FIG. 8 is a cross-sectional view through FIG. 7.

DETAILED DESCRIPTION OF THE INVENTION

Figure 1:
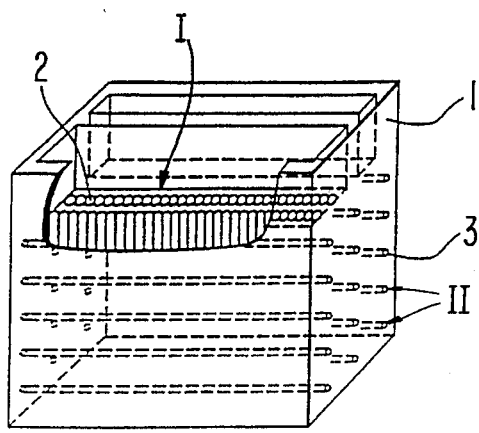
FIG. 1 is a perspective and schematic view of a monoblock according to the invention for explaining the essential features of the invention.

Referring to FIG. 1, a heat exchanger block 1 is illustrated. Preferably, heat exchanger block 1 is a monoblock composed of a ceramic material. In this particular figure, heat exchanger block 1 has crossing conduits, so that a hot, aggressive gaseous medium I is conducted through the vertical, slot-shaped conduits 2, while a cooling medium II is conducted through the horizontal conduits 3. The geometrical arrangement of conduits 2 and 3 makes a mixing of the media impossible. Although in this illustration conduits 3 are tubular shaped, they may also be slot shaped similar to conduits 2.

Figure 2:
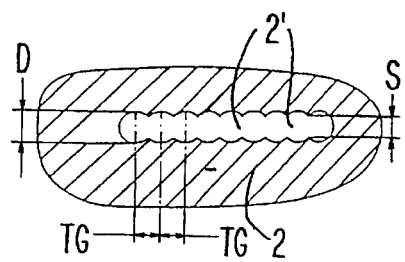
FIG. 2 is an enlargement of a section through the monoblock and illustrating a profile of one of the oblong, tooth-shaped slots.
Figure 13:
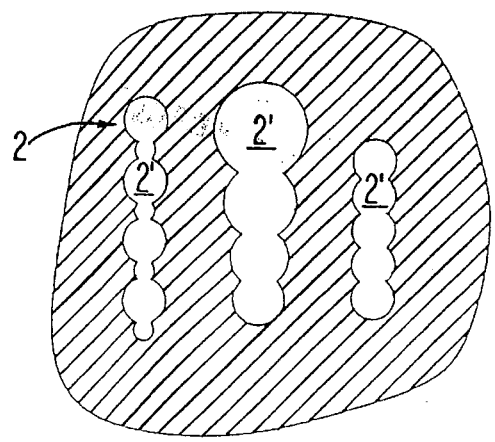
FIG. 13 corresponds to FIG. 2, but additionally shows bores of different diameters.
Figure 3:
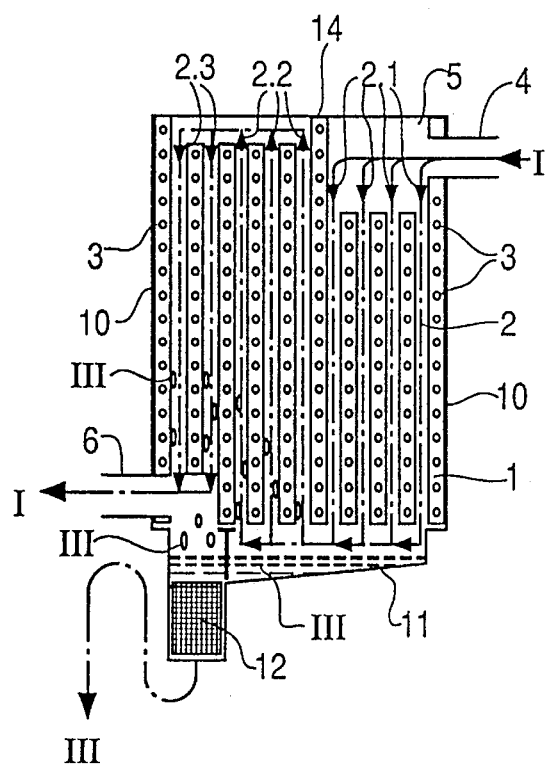
FIG. 3 is a longitudinal sectional view through a heat exchanger constructed from a monoblock according to the present invention.

Referring also to FIG. 2, conduits 2 are composed of a plurality of parallel bores 2'. A spacing TG between two parallel bores is smaller than a diameter D of bore 2'. If a plurality of parallel bores 2' are drilled under these conditions, the result is a conduit 2 having a cross-sectional profile of an essentially oblong slot and having a plurality of walls, each wall having a toothed profile, i.e., a cross-sectional profile of overlapping circular arcs. As shown in FIG. 13, the spacing between centers of adjacent circular arcs can be the same, or can vary. Further, the circular arcs can have differing radii, if needed.

Bore diameter D, spacing TG, and the total number of bores determine the length and shape of conduit 2. By varying spacing TG and bore diameter D, a gap S formed between the crest of opposing teeth of conduit 2 can be adapted to the respective operating requirements.

Figure 10:
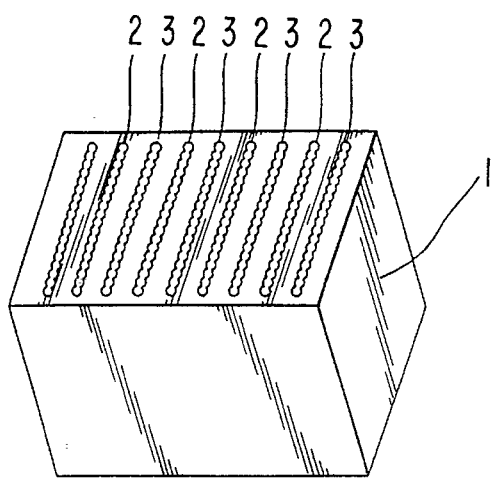
FIG. 10 illustrates two conduit systems according to the invention extending parallel to one another.
Figure 11:
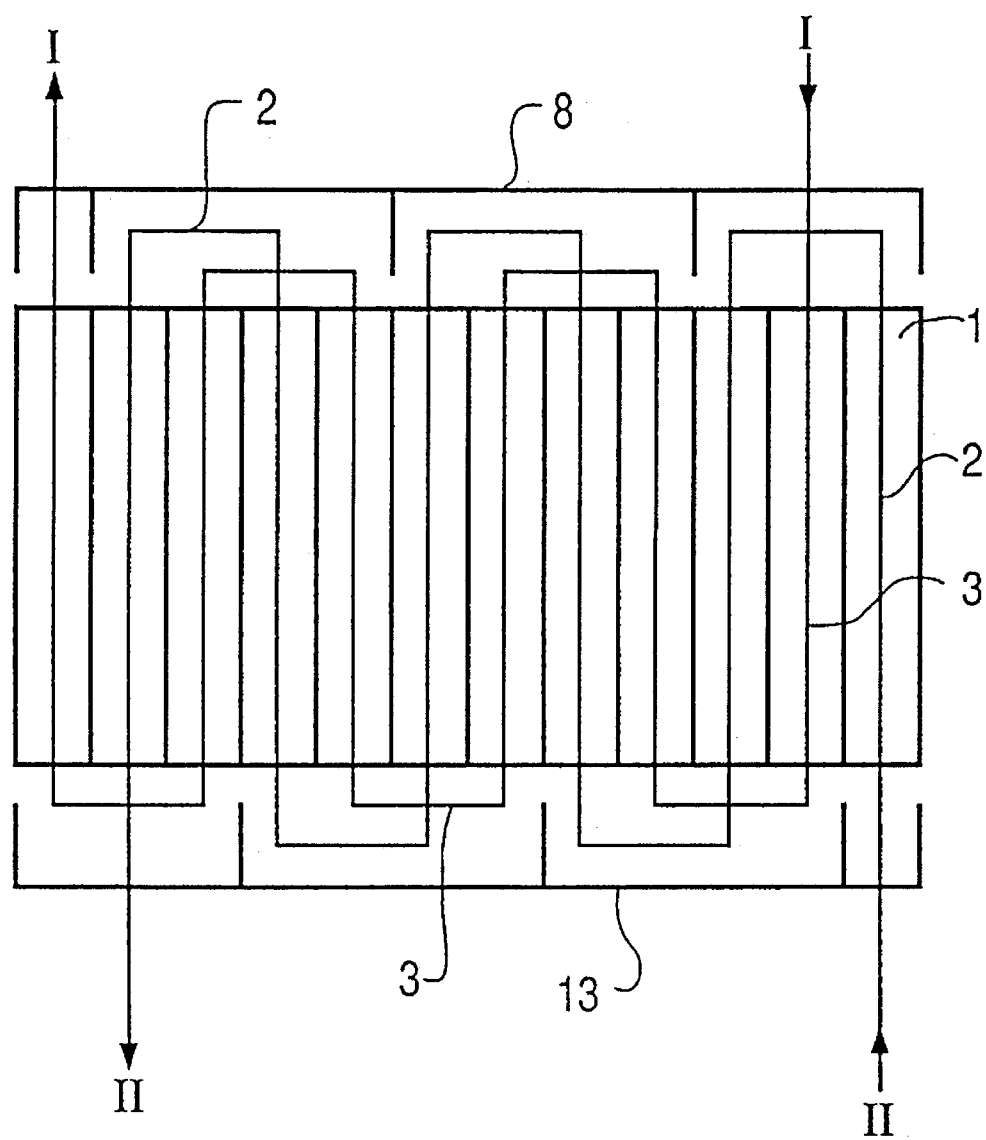
FIG. 11 shows details of the media conveyance according to FIG. 10.

Referring briefly to FIGS. 10 and 11, the same advantageous features can be achieved by connecting a plurality of conduits 2 in parallel. If a plurality of conduits 2 are connected in parallel, a tubular conduit 3 is always located between two conduits 2.

Figure 9:
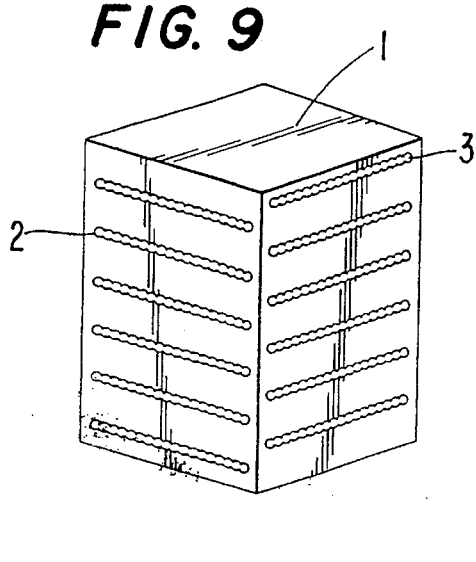
FIG. 9 is a perspective view of a monoblock having two horizontally disposed crossing conduit systems, each system being composed of conduit slots having toothed profiles.
Figure 12:
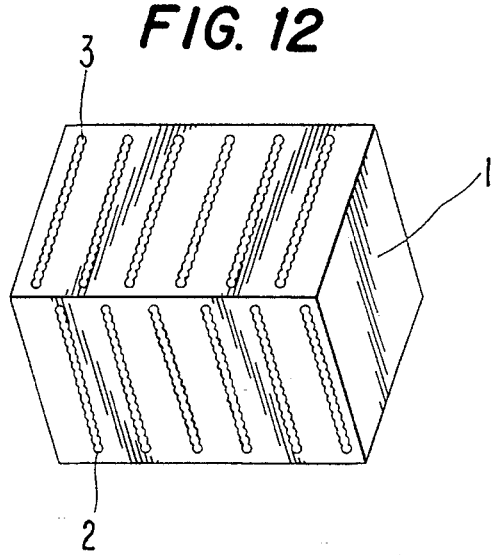
FIG. 12 is a representation of a vertical and horizontal arrangement of the two respective conduit systems.

Referring briefly to FIGS. 9 and 12, various alternate arrangements and configurations of the conduit system are illustrated. FIG. 9 illustrates block 1 having two horizontally disposed crossing conduit systems, each system being composed of conduit slots 2, 3 having toothed profiles. FIG. 12 is similar to FIG. 9, but illustrates the conduits 2, 3 in a vertical and horizontal arrangement.

Referring also to FIGS. 3 through 6, block 1 is typically provided to cool an aggressive gaseous medium, for example, exhaust gases. In the process, first an acid thaw point of the gasses is passed through and, during further cooling, a water vapor dew point is passed through. This causes the water vapor contained in the exhaust gases to condense and form a condensate III. Thus, any harmful substances ($SO_3$, $SO_2$, $C_{12}$, etc.) contained in the aggressive exhaust gases are removed by condensate III, advantageously reducing the harmful substances contained in the exhaust gas.

The condensate III which forms (sulfurous acid, HCl, etc.) is extremely aggressive, and requires the use of corrosion-resistant materials for block 1, such as a ceramic. For example, the use of an impregnated graphite has proven effective. Impregnated graphite allows for the efficient and economical manufacturing of heat exchanger blocks in accordance with the present invention.

The function of the heat exchanger is described in conjunction with FIGS. 3 through 6. The hot, aggressive gaseous medium I passes through an entrance nipple 4, and enters a distributor chamber 5. Medium I then passes through, for example, slot-shaped conduits 2.1, 2.2, and 2.3 and exits the heat exchanger via exit nipple 6. Medium II passes through either a nipple 7, or a plurality of nipples 7.1, 7.2, 7.3, for example, and enters a distributor chamber 8 for distribution to conduits 3. Medium II then passes through the conduits, and exits via a nipple 9 or a plurality of nipples 9.1, 9.2, and 9.3.

Conduits 2 are geometrically arranged so that all surfaces exposed to hot gaseous medium I are cooled, both in conduits 2 and in a region of distributor chamber 5, which is a highly thermally stressed element. Typically, conduits 3 conduct water as medium II, which likewise cools distributor chamber 5. Heat exchanger block 1 is comprised of a plurality of outer walls 10, which are advantageously also cooled by the arrangement of conduits 2, so thermal insulation may be unnecessary.

Gaseous medium I is cooled in the heat exchanger block 1 during its passage from entrance nipple 4 to exit nipple 6. As such, the specific density of gaseous medium I increases. If the flow cross-section of conduit 2 remains constant, a flow speed of medium I through conduit 2 will increase in proportion to the increase of the specific density.

Because the flow speed of gaseous medium I significantly influences the heat transfer output, preferably the flow speed is maintained at a constant level, i.e., with no increases in speed along the flow path. This is advantageously accomplished by varying bore diameter D of conduit 2, and/or by arranging a plurality of conduits 2, 2.1, 2.2, and 2.3 in parallel.

As already described, the walls of conduits 2, 2.1, 2.2, 2.3 have a sawtooth (i.e., wave-shaped) profile. With a wave-shaped profile, the surface area of the conduit is increased considerably over a comparable, smooth profile. As mentioned, an increased surface area advantageously increases the heat transfer output of the heat exchanger.

Figure 4:
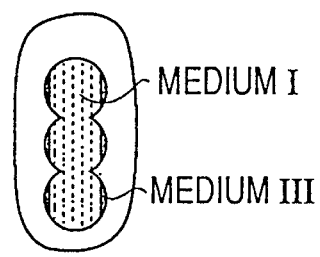
FIG. 4 is a view similar to FIG. 2, with additional explanations.
Figure 5:
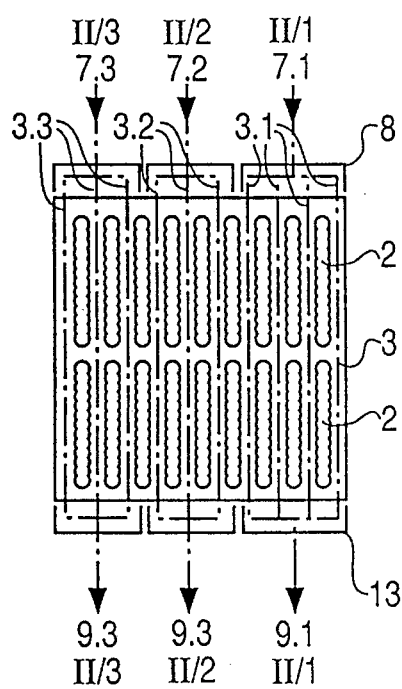
FIG. 5 is an illustration of a longitudinal section through the heat exchanger according to FIG. 3 of a first embodiment.
Figure 6:
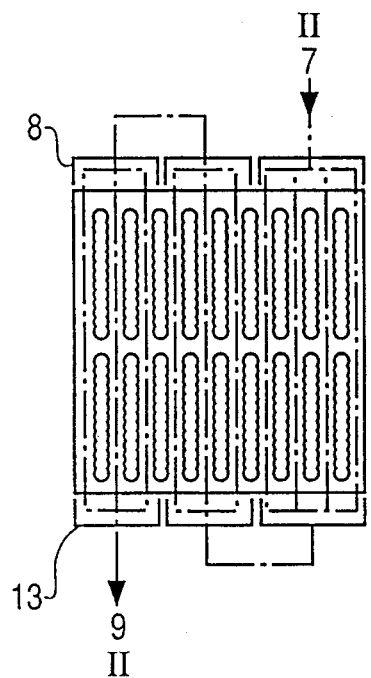
FIG. 6 is an illustration of a longitudinal section through the heat exchanger according to FIG. 3 of a second embodiment.

As shown in FIG. 4, a separation of gaseous medium I and condensate III is also accomplished with a wave-shaped surface. Condensate III drains from the vertical wave troughs, into a tub 11 (FIG. 3) and is subsequently carried away. Heat exchanger block 1 may also have an integrated neutralization unit 12 for neutralizing the acidic condensate III, before being carried away.

The conveyance of medium II through conduits 3 can be selected according to the particular needs, and depends on the configuration of distribution chamber 8 and a hood 13. Thus, medium II can flow through all conduits 3, 3.1, 3.2, 3.3, etc. as if they were a single duct, i.e., by connecting the conduits in series; alternatively, the conduits 3, 3.1, 3.2, 3.3 can be connected in parallel, thus providing for parallel flow of medium II through the conduits. Each conduit 3, 3.1, 3.2, 3.3, etc., can therefore constitute a separate cooling loop.

A plate 14 is provided for sealing conduit 2 and distribution chamber 5. Preferably, plate 14 is removable for cleaning purposes.

Referring to FIGS. 7 and 8, a heat exchanger block supplemented by a burner 15 is illustrated. Burner 15 allows the exhaust gas heat from flue gases to be used in the heat exchanger block (i.e., as the gaseous medium I). Burner 15 produces a flame (not shown), which burns in distribution chamber 5 on an entrance side of the heat exchanger block and causes distribution chamber 5 to function as a combustion chamber. In the Figures, burner 15 is inserted into a wall of the heat exchanger block. Typically, distribution chamber 5 is protected by a thermal protective element 16.

After passing through distribution chamber 5, the exhaust gases flow through a converter 17 and then through conduits 2, as indicated by the arrows in FIGS. 7 and 8.

Using the aforementioned configuration, nitrogen can be removed from the flue exhaust gases using converter 17, and condensate III can be neutralized using neutralization unit 12. An air exhauster 18 can be provided at the outlet of the heat exchanger block to facilitate the flow-through of gaseous medium I. Typically, an absorption unit 20 is additionally provided for absorbing any harmful gaseous substances in the exhaust gas.

FIG. 8 also illustrates a contact surface 21 between gaseous medium I and an upper level of condensate III. Absorption unit 20 is configured so that it is constantly moistened by the condensate. Using capillary action, the condensate climbs constantly toward absorption unit 20, thus keeping it moist. Additionally, a fluid level control unit 22 for controlling a level of condensate III is provided.

The invention now being fully described, it will be apparent to one of ordinary skill in the art that any changes and modifications can be made thereto without departing from the spirit or scope of the invention as set forth herein.

What is claimed is:

1. A heat exchanger block comprising:

a monoblock composed of a ceramic material and having two separate conduit systems for media flowing through said monoblock, at least one of the conduit systems including a conduit having a cross-sectional profile of an essentially oblong slot and having a plurality of walls, each wall having a cross-sectional profile of overlapping circular arcs, said circular arcs having differing radii.

2. A heat exchanger block as defined in claim 1, wherein a spacing between centers of adjacent circular arcs is identical.

3. A heat exchanger block as defined in claim 1, wherein an area defined by the cross-sectional profile of the oblong slot changes in a flow direction of the media.

4. A heat exchanger block as defined in claim 1, wherein said monoblock comprises impregnated graphite.

5. A heat exchanger block as defined in claim 1, further comprising a neutralization unit integrated into a bottom of said heat exchanger block for neutralizing a liquid condensate.

6. A heat exchanger block as defined in claim 1, wherein said at least one conduit system has an inlet on a side of said monoblock, said monoblock defining a hollow chamber integrated therein; further comprising a burner attached to the inlet side of said monoblock and having a flame burnable within the hollow chamber.

7. A heat exchanger block as defined in claim 6, further comprising a converter provided in a region of the inlet of said at least one conduit system.

8. A heat exchanger block as defined in claim 6, further comprising an absorber provided within said monoblock for absorbing harmful substances.

9. A heat exchanger as defined in claim 1, wherein a spacing between centers of adjacent circular arcs varies.

10. A heat exchanger block comprising:

a monoblock composed of a ceramic material and having two separate conduit systems for media flowing through said monoblock, at least one of the conduit systems including a conduit having a cross-sectional profile of an essentially oblong slot and having a plurality of walls, each wall having a cross-sectional profile of overlapping circular arcs, wherein a spacing between centers of adjacent circular arcs varies.

11. A heat exchanger block as defined in claim 10, wherein the circular arcs have identical radii.

12. A heat exchanger block as defined in claim 10, wherein an area defined by the cross-sectional profile of the oblong slot changes in a flow direction of the media.

13. A heat exchanger block as defined in claim 10, wherein said monoblock comprises impregnated graphite.

14. A heat exchanger block as defined in claim 10, further comprising a neutralization unit integrated into a bottom of said heat exchanger block for neutralizing a liquid condensate.

15. A heat exchanger block as defined in claim 10, wherein said at least one conduit system has an inlet on a side of said monoblock, said monoblock defining a hollow chamber integrated therein; further comprising a burner attached to the inlet side of said monoblock and having a flame burnable within the hollow chamber.

16. A heat exchanger block as defined in claim 15, further comprising a converter provided in a region of the inlet of said at least one conduit system.

17. A heat exchanger block as defined in claim 15, further comprising an absorber provided within said monoblock for absorbing harmful substances.

* * * * *